Dec. 13, 1927.
J. B. ALLEN
1,652,552
COFFEEPOT
Filed Dec. 17, 1925
2 Sheets-Sheet 1
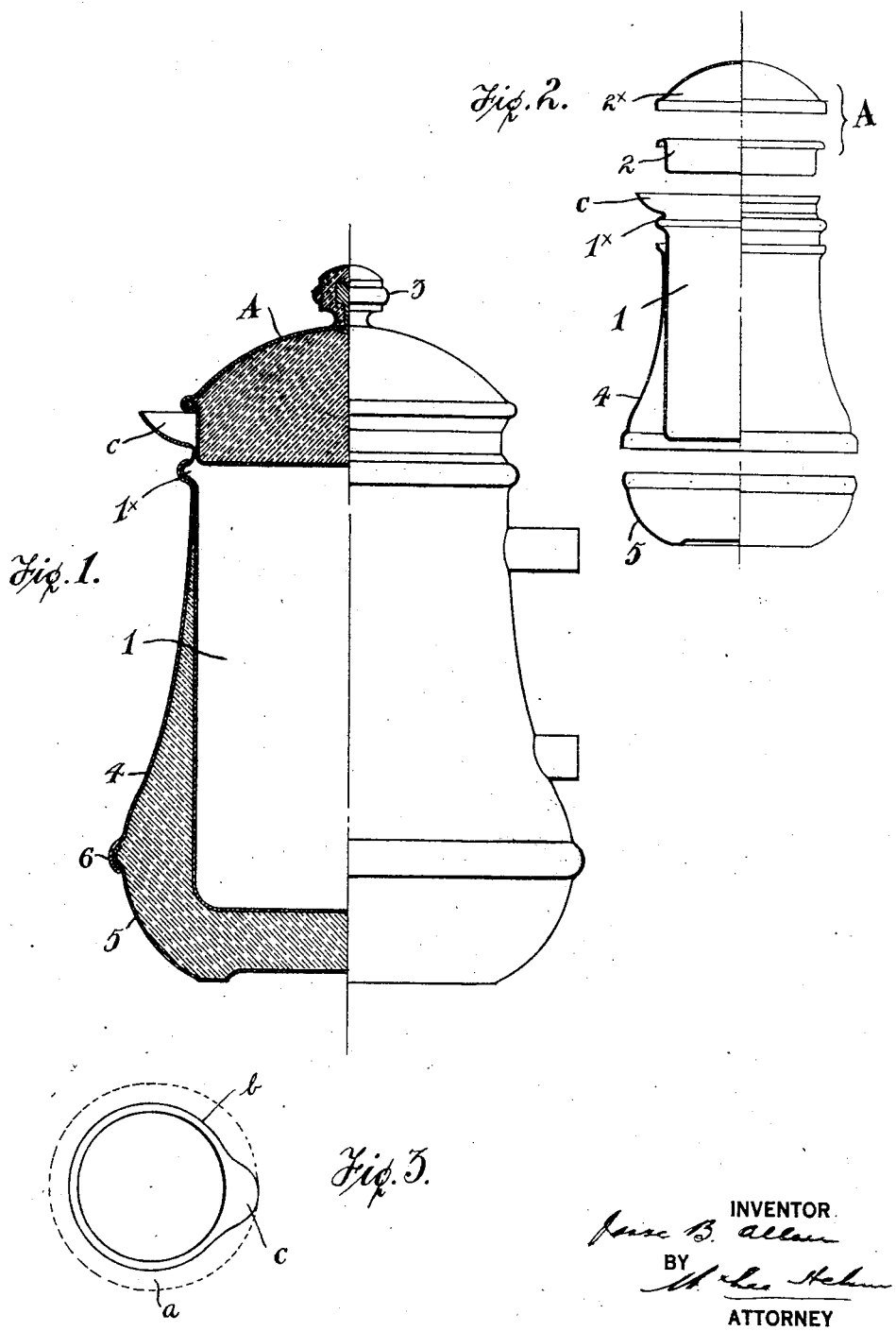
INVENTOR
Jesse B. Allen
BY
ATTORNEY Dec. 13, 1927.
J. B. ALLEN
1,652,552
COFFEEPOT
Filed Dec. 17, 1925
2 Sheets-Sheet 2
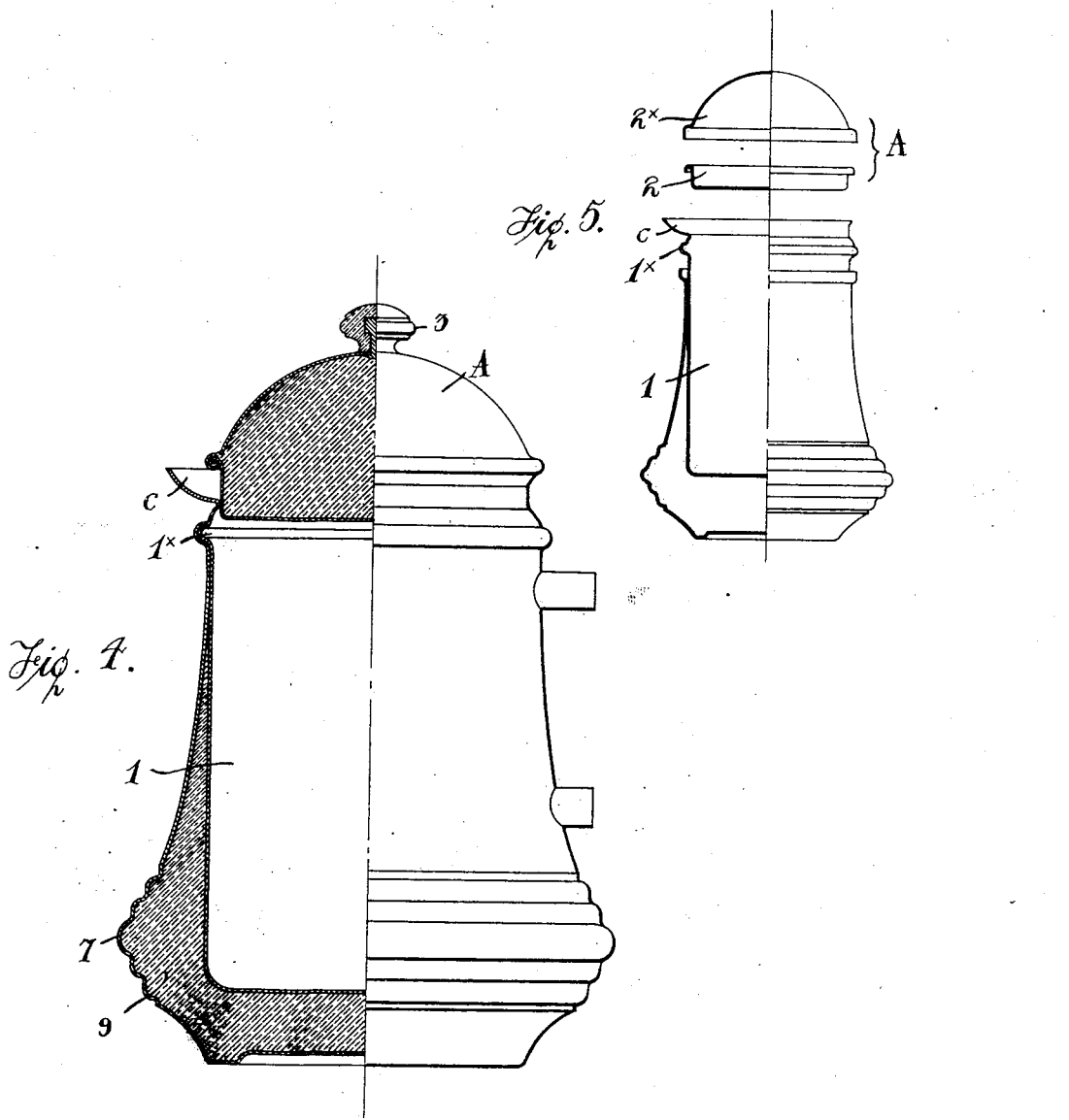

Patented Dec. 13, 1927.

1,652,552

UNITED STATES PATENT OFFICE.

JESSE B. ALLEN, OF NEW YORK, N. Y.

COFFEEPOT.

Application filed December 17, 1925. Serial No. 75,952.

The object of the present invention is to provide a coffee pot or the like suitable for use in hotels, and particularly for room service and for such purpose so constructed as to maintain the heat of the liquid for several hours. A further object of the invention is to so construct, form and combine the elements of the device that it may withstand hard service and be manufactured and assembled by simple and relatively inexpensive operations.

The invention will be understood by reference to the accompanying drawings, in which—

Figure 1 is a view in elevation, semi-sectional, showing the elements assembled;

Figure 2 is a similar view showing the elements separated from each other but in position for assembly;

Figure 3 is a diagrammatic plan view of the inner container showing by dotted lines the method of formation of the lip;

Figure 4 is a view similar to Figure 1 but of a modified form of device, and

Figure 5 is a view of the elements shown in Figure 3 separated, but in position for assembly.

Referring to Figures 1 and 2, 1 represents the liquid receiving member, which is formed as a cylinder having an external bead $1^x$ near its upper end. The cylinder is flared outwardly above the bead so as to have, originally, the form indicated by the annular line $a$, Figure 3. In the process of manufacture the flare is cut away on the solid line $b$, Figure 3, so as to form the lip or spout $c$.

The formation of bead $1^x$ and the outward flare above it provides a springy contacting wall for the cover member A, the said member comprising a depending unit 2 which fits within the container 1 and an upper unit $2^x$ which carries the lifting knob 3. The upper edge of cover unit 2 is curled outwardly to form a bead and the lower edge of unit $2^x$ is turned over the bead so as to lock the two units together and form a single rigid structure.

Surrounding container 1 and spaced therefrom except at and in proximity to bead $1^x$ is an outer casing comprising an upper unit 4 and a lower unit 5, the two being secured together at 6. Within the chamber provided by the space between the liquid container 1 and the outer casing is packed an insulating material such as kieselguhr or other infusorial earth. Also prior to the assembly of the cover units 2, $2^x$ I pack them with a like insulating material.

In the modified form illustrated in Figures 4 and 5 the outer casing is a unitary member and is flared outwardly beginning at the bead $1^x$ and extending to the central of a series of annular bulges 7, the casing being then flared inwardly to its base. Thus the weight of the infusorial earth packing 9 is largely massed at and lateral of the base of the liquid container 1, thus rendering the pot unusually stable and resistant to overturning.

It will be understood that if desired the bead $1^x$ may be formed by applying a ring of metal to the exterior wall of the jacket member so as to leave the interior of the latter smooth rather than channeled.

Having described my invention what I claim and desire to secure by Letters Patent is as follows:—

A coffee pot comprising a metallic container formed near its upper end with an outwardly extending bead merging into an outward flare forming a lip, a casing dependently held by said bead and spaced from the outer wall of the said container to form a chamber, an insulating packing in said chamber, and a cover member comprising two units locked together and enclosing an insulating packing.

In testimony whereof, I have signed my name to this specification.

JESSE B. ALLEN.